United States Patent [19]
Siddiqui

[11] Patent Number: 5,081,348
[45] Date of Patent: Jan. 14, 1992

[54] OPTICAL POLARIMETER HAVING FOUR CHANNELS

[75] Inventor: Ahmed S. Siddiqui, Colchester, England

[73] Assignee: University of Essex, Wivenhoe Park, England

[21] Appl. No.: 711,504

[22] Filed: Jun. 3, 1991

Related U.S. Application Data

[63] Continuation of Ser. No. 382,769, Jul. 20, 1989, abandoned.

[30] Foreign Application Priority Data

Jul. 21, 1988 [GB] United Kingdom ............... 8817382

[51] Int. Cl.$^5$ ............................. G02F 1/01; G01J 4/00
[52] U.S. Cl. ..................................... 250/225; 356/367
[58] Field of Search ................... 250/225, 227, 227.21, 250/227.23, 227.28; 356/364, 365, 366, 367

[56] References Cited

U.S. PATENT DOCUMENTS

| | | | |
|---|---|---|---|
| 3,556,662 | 1/1971 | Levenstein et al. | 356/367 |
| 4,158,506 | 6/1979 | Collett | 356/365 |
| 4,171,916 | 10/1979 | Simms et al. | 250/225 |
| 4,392,723 | 7/1983 | Gehmann | 350/407 |
| 4,681,450 | 7/1987 | Azzam | 356/367 |
| 4,698,497 | 10/1987 | Miller et al. | 250/225 |
| 4,777,358 | 10/1988 | Nelson | 250/225 |
| 4,904,085 | 2/1990 | Spillman, Jr. et al. | 356/366 |

OTHER PUBLICATIONS

Detken, "Polarimetric Methods in Astrophysics", Jena Review, 6/70, pp. 330-334.

Hannemann, "A Polarimeter to Measure the Complete State of Polarization of Scattered Solar Radiation", Contrib. Atmos. Phys. (GB), vol. 48, No. 1, 1975, pp. 76-84.

*Primary Examiner*—David C. Nelms
*Assistant Examiner*—Michael Messinger

[57] ABSTRACT

A method of and an apparatus for rapidly determining the polarization state of an incoming beam of light, such as from a fibre optic. The incoming beam is passed through a beam expander and then four separate portions of that beam are passed simultaneously through four Stokes filters respectively, arranged in a common plane. The four filtered beam portions are directed by respective lenses on to four detectors providing electrical signals indicative of the intensity of the respective filtered beams. From these four signals, the Stokes parameters may be deduced. The method allows very rapid assessments of the polarization state of an incoming beam to be achieved, and a bandwidth of several tens of KHz is attainable.

11 Claims, 2 Drawing Sheets

OPTICAL POLARIMETER HAVING FOUR CHANNELS

CROSS REFERENCE TO RELATED APPLICATIONS

This is a continuation of copending applications Ser. No. 07/382,769 filed on July 20, 1989, now abandoned.

BACKGROUND OF THE INVENTION a) Field of the Invention

This invention relates to a method of and apparatus for determining the state of polarisation of a pencil of electromagnetic radiation. In particular, though not exclusively, the invention relates to such a method of and apparatus for determining the state of polarisation of an incoming pencil of electromagnetic radiation in or closely adjacent the visible spectrum.

b) Description of the Prior Art

The state of polarisation of an electromagnetic wave may be represented by a polarisation ellipse, the limiting states of which are when the ellipse degenerates into a straight line, or into a circle. In these two limiting cases, the wave is described as being linearly polarised or circularly polarised, as appropriate. The state of polarisation of a wave may be described by four parameters $S_0$, $S_1$, $S_2$ and $S_3$ known as the Stokes parameters. The parameter $S_0$ is proportional to the intensity of the wave, whereas the parameters $S_1$, $S_2$ and $S_3$ are related in a simple way to the angle which specifies the orientation of the polarisation ellipse, and also to the angle which characterises the ellipticity and the sense in which the ellipse is being described. An alternative representation for the polarisation of a wave is the Poincare sphere, and in this case the parameter $S_0$ represents the radius of the sphere and the parameters $S_1$, $S_2$ and $S_3$ are the Cartesian co-ordinates of a point P on the sphere which uniquely describes the state of polarisation of the wave.

The four Stokes parameters are not totally independent of each other, but are related to each other by the relationship $$S_0^2 = S_1^2 + S_2^2 + S_3^2$$

Therefore experimentally to determine the state of polarisation of a wave, a minimum of three measurements need to be performed on the wave to obtain characteristics from which the four Stokes parameters can be deduced. In practice, however, it is usual to make four measurements as this provides a consistency check on the measurements through the above relationship between the Stokes parameters. There have been various proposals for methods and apparatus to fulfil this objective. Such methods and apparatus have been described for example in "Survey of Methods for the Complete Determination of a State of Polarisation" by P. S. Hague, published in SPIE Volume 88, page 3-10, 1976 and all currently-available apparatus operates on one of the several methods described in that paper. Despite the age of that paper, it still represents the state of the art so far as the fundamental operating methods are concerned, though the various apparatuses described have of course since then been improved.

Each of the methods described in the paper by Hague has disadvantages, the significance of which depends upon the use to which apparatus operating on that method is put. The technique of using an adjustable retarder and analyser ("Method 1" in Hague's paper) requires the presence of a wave the polarisation of which remains substantially constant for a relatively long period of time, in order to allow the four measurements to be performed sequentially on that wave, each of the four measurements requiring the angular orientation of the retarder or the analyser, or both, to be reset. This puts up a limit on the minimum possible sampling time of the order of several tens of seconds, needed to complete the required four measurements and so to obtain an accurate assessment of the state of polarisation of the wave.

The use of a rotating element polarimeter ("Method 2" in Hague's paper), allows very much faster measurements to be performed. By continuously rotating a quarter-wave plate in the optical axis, it is possible to perform spectral analysis on an electrical signal produced by an optical detector, which analysis is timed to the plate rotation. In this way, a sampling time of the order of one second can be obtained. More recently, there have been proposals for electro-optic simulations of rotating quarter-wave plates, where a suitable crystal for example of lithium-niobate has two orthogonal pairs of electrodes deposited across it, which are electronically driven in quadrature. With sampling the optical detector output at relatively high rates a band width of up to about 150 Hz has been obtained for such a system.

With the advent of optical fibre communication systems, the determination of the state of polarisation of a wave has become most important. The next generation of such communication systems will use coherent detection in homodyne or heterodyne form, for example to enhance receiver sensitivity and to allow tightly-packed wavelength-division multiplexing. If this is to be achieved, it is necessary to match the polarisation states of the signal and local oscillator waves, at the optical detector.

Experience shows that if a well-defined linearly-polarised wave is fed from a transmitter into a 'real' long optical fibre cable, the polarisation state of the wave emerging from the cable fluctuates randomly. This in effect constitutes polarisation noise which is associated with the received optical signal, and this leads to a need for a polarisation controlling device as a part of a polarisation tracking loop, to enable the local oscillator polarisation to be continually changed so as to keep the latter precisely matched to the fluctuating polarisation state of the received optical signal.

There is thus a need for a polarimeter able to determine accurately and quickly the polarisation state of a relatively small beam of light, on the one hand to enable the development of suitable polarisation controllers, and on the other to characterise the polarisation noise associated with optical fibre communication systems.

A basic method for determining the state of polarisation of a wave is to perform a minimum of three, but in practice usually four, separate transmitted intensity measurements on the wave, each time using a different 'filter' arrangement in the optical path of the wave to the intensity detector. Such a set of 'filters', allowing the derivation of the Stokes parameters merely from light intensity measurements following the passage of the light therethrough, will hereinafter be referred to as a set of "Stokes filters". An example of a set of "Stokes filters", as defined just above, comprises a first 'filter' totally insensitive to polarisation but having a 50% transmission factor, though this filter could have other transmissivities (up to 100%—e.g. a clear aperture)

provided appropriate corrections are then applied in the subsequent analysis of the polarisation state. The second and third filters are linear polarisers with their transmission axes at 45° to each other, and the fourth filter is a circular polariser, being a combination of a linear polarizer and a phase retardation plate, and opaque to left-handed circular polarised light.

It should be emphasised that the example of a particular set of filters as described above represents only one of an infinite number of possible sets of filters which could fulfil the definition of a set of 'Stokes filters' given above.

A set of Stokes filters, as described above, may be used to attempt to determine the state of polarisation of a beam of light issuing from a fibre optic cable. However preliminary trials have shown that the polarisation noise spectrum of such a beam might extend from DC up to perhaps 2 or 3 kHz, which is well beyond the measuring capability of known forms of polarimeter using a set of Stokes filters and constructed in accordance with the teachings of Hague. Though theoretically a system employing a set of Stokes filters including an electronic simulation of a quarterwave plate could perhaps achieve a measurement bandwidth of about 8 kHz, such a polarimeter would be extremely expensive to construct and could really be regarded only as a piece of laboratory equipment; it would not be practical to construct such a polarimeter as a commercial, robust, easy-to-use and automatic polarimeter, both for static and dynamic measurements.

OBJECTS OF THE INVENTION

It is a principal object of the present invention to provide a method of and apparatus for determining the state of polarisation of a relatively narrow wave which method and apparatus are able substantially to reduce the disadvantages discussed above of the known polarimeter techniques.

More specifically, it is an object of the invention to provide a high-speed method of determining the polarisation state of an incoming beam.

Another object is to provide a method which is able to operate on light emanating from a fibre optic, at a speed able to detect random polarisation noise on that light.

Yet another object is to provide apparatus which is robust and simple to operate, in determining the polarisation state of a light beam, such as that leaving a fibre optic.

A further object is the provision of apparatus able to detect the polarisation state of a light beam and having a bandwidth of several tens of KHz.

SUMMARY OF THE INVENTION

In accordance with the foregoing and other objects, one aspect of the present invention provides a method of determining the polarisation state of an incoming collimated beam of electromagnetic radiation, comprising:

passing the beam through a beam expander to produce an expanded collimated beam of greater diameter than that of the incoming collimated beam; dividing said expanded beam into four separate beam portions which said beam portions are passed simultaneously through four channels with respective first, second and third filters being provided in the first, second and third channels, the first and second filters being linear polarizers with their respective planes of polarization lying at an angle to one another, the third filter being a combination of a linear polarizer and a phase retardation plate, and the fourth channel being insensitive to polarization;

determining the intensity of each said expanded beam portion following the passage thereof along the respective channel; and analysing the determined intensities to yield an indication of the polarisation state of the incoming beam.

It will be appreciated that in the polarimetry method of the present invention, all four measurements on the incoming beam and which are required for deduction of the Stokes parameters are performed essentially simultaneously. The consequence is that very fast analysis of the polarisation state is achievable.

According to a second aspect of the present invention, there is provided apparatus for determining the state of polarisation of an incoming collimated beam of electromagnetic radiation, which apparatus comprises:

a beam expander to increase the effective diameter of the incoming beam of light; means dividing the expanded beam into four channels and for mounting a set of filters n the optical paths of the channels, which said set of filters comprises first and second filters being linear polarisers with their respective planes of polarization lying at an angle to one another, a third filter being a combination of a linear polarizer and a phase retardation plate, and the fourth channel being insensitive to polarization whereby four portions of said expanded beam are directed along the four channels respectively and filtered accordingly; and four intensity detectors one associated with each of said channels respectively, and disposed to detect the intensity of the respective beam portion and to produce an output dependent thereon.

BRIEF DESCRIPTION OF THE DRAWINGS

In order that the invention may better be understood, it will now be described in greater detail and certain specific embodiments thereof given, referring as necessary to the accompanying drawings, in which.

DESCRIPTION OF THE PREFERRED EMBODIMENTS

Figure 1:
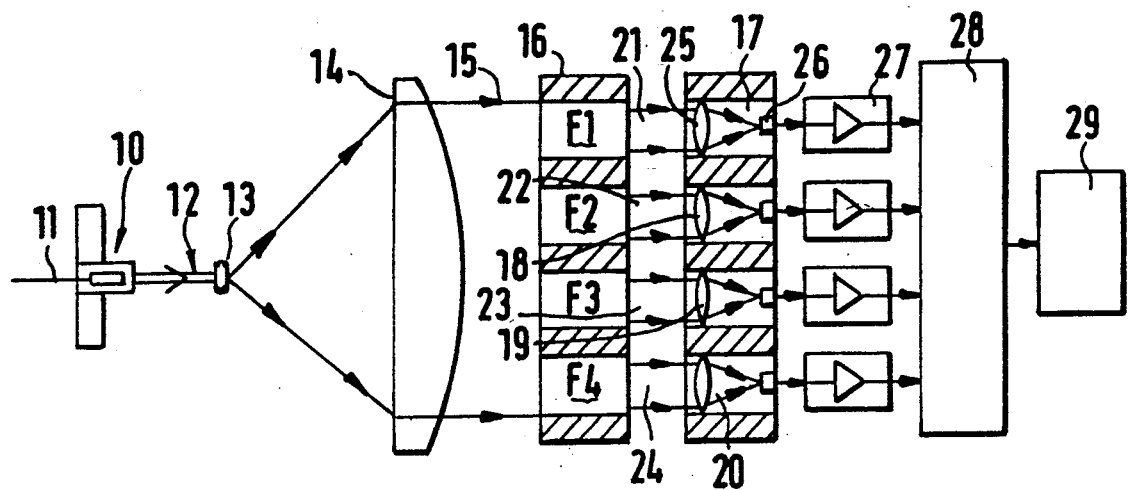
FIG. 1 is a block diagram showing the principles of operation of a polarimeter of this invention.

Though both the method and apparatus of this invention as described above are suitable for use in various circumstances, both particularly lend themselves to the determination of the state of polarisation of a light beam emerging from an optical fibre. Such a beam of light will normally be divergent, and consequently a collimating lens should be provided adjacent the fibre end to collimate the divergent beam into a narrow pencil of light typically of about 1 mm to 2 mm in diameter. In the following further description of this invention, reference will be made exclusively to such narrow beams of light, thought it will be understood that the invention is not limited to such.

In the apparatus of this invention, it is convenient for the four Stokes filters of the set thereof to be grouped together, so as to lie substantially in the same plane. For example, each such filter may be circular and may be assembled within an aperture in a carrier such that all four filters are symmetrically disposed with respect to the optical axis of the apparatus.

The four Stokes filters conveniently are described above in the example thereof, though other sets could of course be employed.

Preferably, each intensity detector comprises a lens mounted on the optical path of the respective beam portion, together with a photosensitive element on to which said lens focuses the beam portion. Associated with each photosensitive element may be an amplifier, to produce an electronic signal of a sufficient magnitude for further processing.

Conveniently, the derivation of the four Stokes parameters is performed by means of a computer, operating on information derived from the outputs of the intensity detectors. For example, the amplified outputs may be fed to an analogue-to-digital converter, which produces four digital signals corresponding to the four outputs of the intensity detectors, at any given instant. By operating in this way, the band-width of the polarimeter of this invention is essentially limited by the conversion rate of such an analogue-to-digital converter, and using the technology currently available, sampling speeds of several tens of kHz can be obtained.

When the apparatus of this invention is being employed in conjunction with a fibre optic cable, the apparatus should include a fibre coupler associated with a GRINROD, or some other type of lens, producing a collimated beam of light, on the optical axis of the beam expander. In this way, the apparatus may be used to perform continuous monitoring of the polarisation state of an incoming light wave, with sampling performed typically at a frequency of up to several tens of kHz.

This invention extends both to methods of and apparatus for determining the state of polarisation of an incoming collimated beam of electromagnetic beam of radiation as described above, but wherein no beam expander is provided. It will be appreciated that this aspect of the present invention is applicable to such case where the incoming beam is of a sufficient size for portions thereof to be passed directly through the four separate Stokes filters (as hereinbefore defined) simultaneously.

Figure 2:
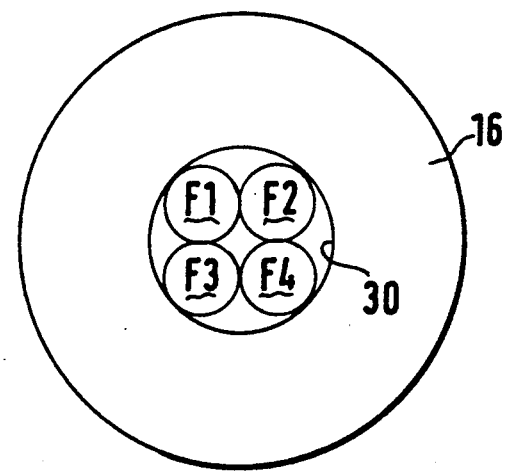
FIG. 2 is an end view on the filter assembly used in the polarimeter of FIG. 1.

Reference will now be made to the accompanying drawings, showing firstly the principles of this invention and secondly a specific embodiment of polarimeter. FIGS. 1 and 2 show in diagrammatic form the configuration of a polarimeter arranged to operate in accordance with this invention. This polarimeter comprises a fibre coupler and GRINROD lens assembly 10, configured to receive an optical fibre 11 and to produce a collimated pencil 12 of light, from the wave issuing from the fibre 11. A beam expander, comprising a pair of lenses 13 and 14 is mounted on the optical path of the pencil 12, and produces a collimated beam 15 of a diameter many times greater than the diameter of the pencil 12. A filter carrier 16, having four Stokes filters F1, F2, F3 and F4 mounted therewithin, is disposed on the optical axis of the beam expander, such that four separate portions of the collimated beam 15 pass through the four filters F1, F2, F3 and F4 respectively. Four intensity detectors 17, 18, 19 and 20 are mounted to receive the four filtered beam portions 21, 22, 23 and 24, each intensity detector comprising a lens 25 and a photodetector 26, on to which the respective beam portion is focused by the lens 25. The output of each photodetector is supplied to a respective amplifier 27, and the output of all four amplifiers is supplied to an analogue-to-digital converter 28. The digitised signal outputs from the converter 28 are fed to a computer, for further processing.

As illustrated in FIG. 2, the filter carrier 16 is of circular overall shape, and has a circular aperture 30 in which are mounted the four filters F1, F2, F3 and F4. The four filters comprise Stokes filters (as defined hereinbefore) though filter F1 may in fact simply comprise an open aperture. However, if filter F1 comprises a 50% transmission filter, and the other three filters as specified hereinbefore, then the four Stokes parameters $S_0$, $S_1$, $S_2$ and $S_3$ may be derived from the following equations, where $I_0$, $I_1$, $I_2$ and $I_3$ are the detected light intensities of the beam portions, following filtration through the filters F1 to F4:

$$S_0 = 2 I_0$$
$$S_1 = 2 I_1 - 2 I_0$$
$$S_2 = 2 I_2 - 2 I_0$$
$$S_3 = 2 I_3 - 2 I_0$$

Figure 3:
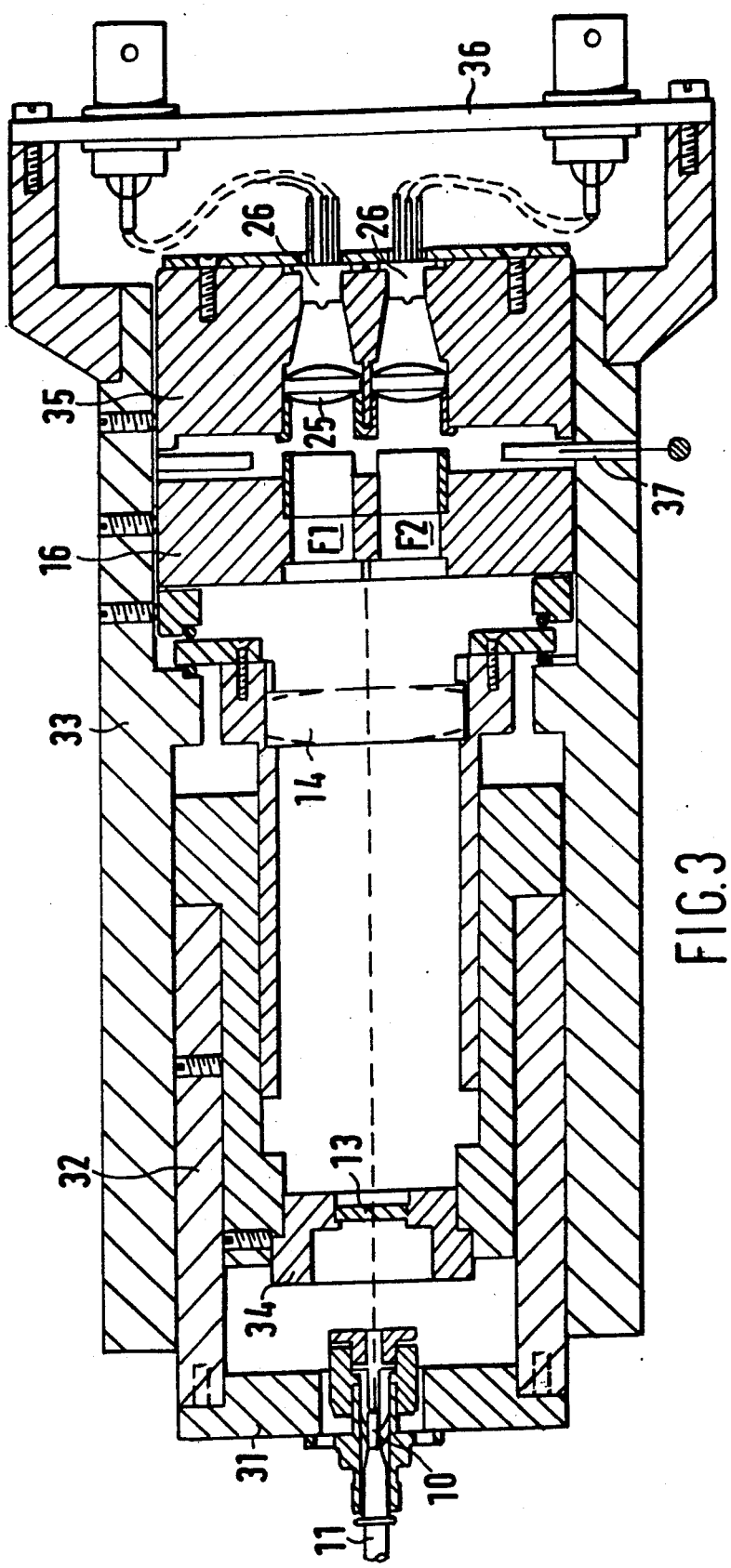
FIG. 3 is a vertical sectional view through the specific embodiment of polarimeter of this invention.

Referring now to FIG. 3, there is shown a practical embodiment of a polarimeter of this invention. Like parts with those of FIGS. 1 and 2 are given like reference characters and will not therefore be described in detail here.

The fibre carrier and GRINROD lens 10 is supported on a plate 31 carried at one end of a barrel 32 supported in a suitable frame 33. The barrel 32 also supports the two lenses 13 and 14 of the beam expander, a carrier 34 for the lens 13 being adjustable to permit the precision focusing adjustment of the expander.

Also mounted in the frame 33 is the filter carrier 16, and a further carrier 35 for the intensity detectors 17-20. The frame 33 supports an end plate 36 on which are provided suitable electrical connectors for wires from the detectors 26.

An adjustable iris diaphragm 37 is mounted in the frame 33, between the filter carrier 16 and the further carrier 35, to allow uniform attenuation of all four filtered beams. This allows the dynamic range of the polarimeter to be increased, by prevent saturation of the detectors and/or associated amplifiers, should the incoming beam be particularly intense. A neutral density filter could be used for this purpose, instead of an adjustable diaphragm.

As will be appreciated from the foregoing, the embodiment of polarimeter of this invention is able very rapidly to produce a determination of the state of polarisation of an incoming light wave emanating from an optical fibre. The band-width of the apparatus of this invention is in effect limited by the processing speed of the outputs of the four detectors, and thus bandwidths of several tens of kHz can be achieved.

I claim:

1. A method of determining the polarization state of an incoming collimated beam of electromagnetic radiation, comprising:

passing said incoming beam through a beam expander to produce an expanded collimated beam of greater diameter than that of said incoming collimated beam;

dividing said expanded beam into four separate beam portions which said beam portions are passed simultaneously through four channels with respective first, second and third filters being provided in the first, second and third channels, the first and second filters being linear polarizers with their respective planes of polarization lying at an angle to one another, the third filter being a combination of a linear polarizer and a phase retardation plate, and the fourth channel being insensitive to polarization;

determining the intensity of each said expanded beam portion following the passage thereof along the respective channel; and analyzing the determined intensity to yield an indication of the polarization state of said incoming beam.

2. A method according to claim 1, in which all four said beam portions are equally attenuated prior to the determination of the intensities thereof.

3. Apparatus for determining the state of polarization of an incoming collimated beam of electromagnetic radiation, which apparatus comprises:

a beam expander to increase the effective diameter of said incoming collimated beam of electromagnetic radiation;

means dividing the expanded beam into four channels and for mounting a set of filters in the optical paths of the channels, which said set of filters comprises first and second filters being linear polarizers with their respective planes of polarization lying at an angle to one another, a third filter being a combination of a linear polarizer and a phase retardation plate, and a fourth channel being insensitive to polarization whereby four portions of said expanded beam are directed along the four channels respectively and filtered accordingly;

four intensity detectors one associated with each of said channels respectively, and disposed to detect the intensity of the respective beam portion and to produce an output dependent therefrom and means for analyzing the determined intensity to yield an indication of the polarization state of said incoming beam.

4. Apparatus according to claim 3, in which said set of filters are grouped together and lie substantially in the same plane.

5. Apparatus according to claim 4, in which each said filter is circular and is assembled within an aperture in a carrier such that all four said filters are symmetrically disposed with respect to the apparatus optical axis.

6. Apparatus according to claim 3, in which each said intensity detector comprises a lens mounted on the optical path of the respective beam portion, together with a photosensitive element on to which said lens focuses the beam portion passing therethrough, the photosensitive element producing an electrical signal corresponding to the intensity of said beam portion.

7. Apparatus according to claim 6, in which an amplifier is associated with each said photosensitive element respectively, each said amplifier producing an electrical signal which is fed to an analogue-to-digital converter, thereby to yield four digital signals corresponding to the four outputs of the intensity detectors.

8. Apparatus according to claim 3, in which there is provided a fibre optic coupler having associated therewith a lens to produce from light emerging from a connected fibre optic a collimated beam projected to the beam expanded on the optical axis thereof.

9. Apparatus according to claim 3, in which attenuation means is provided uniformly to attenuate all four said beam portions following the passage thereof through the respective filter of the set thereof.

10. Apparatus according to claim 9, in which said attenuation means comprises an adjustable iris diaphragm.

11. A method according to claim 1, in which the fourth beam portion passes freely along the fourth channel without attenuation or polarizing filtration.

* * * * *